UNITED STATES PATENT OFFICE 2,147,379

METHOD FOR PRODUCING HIGH GRADE ZINC OXIDE

Martin M. Pearlman, Philadelphia, Pa., assignor to Superior Zinc Corporation, Philadelphia, Pa., a corporation of Pennsylvania No Drawing. Application August 26, 1937, Serial No. 161,055

4 Claims. (Cl. 23—147)

This invention relates to a method for the production of high grade zinc oxide suitable for pigment purposes from by-product zinc residues obtained in a wet way, for example, in chemical reductions effected through the use of metallic zinc. The improved zinc oxide may be used as a pigment or for use in the manufacture of various products which require zinc oxide in a fine state of subdivision and of substantial chemical purity.

The zinc residues forming the starting point of this method comprise primarily zinc oxide and zinc carbonate produced in a wet reaction, either or both of which are in at least partially hydrated form. Additionally, the residues generally contain alkali salts such as sodium carbonate or bicarbonate in substantial amounts. Additionally, they may contain zinc and alkali sulphites and sulphates. The residues may also contain metallic zinc which was unoxidized in the reduction. The type of reduction giving rise to such residues may be, for example, the reduction of sodium acid sulphite with zinc to produce sodium hydrosulphite. Other reactions giving rise to similar residues are the preparations of benzidine or various dyes. As a result of some of these reductions there may be organic matter present in the residues.

Heretofore various attempts have been made to produce zinc oxide suitable for pigment purposes or similar uses from such residues. However, the resulting zinc oxides, while they may have been chemically pure, were physically of forms unsuitable for pigment or similar use and were consequently of little value. In one process it was customary to dry and calcine the residues and then separate the zinc oxide from alkali metal salts by washing. Such zinc oxide, however, was of low grade and adaptable for use only for such purposes as the manufacture of zinc chloride, lithopone or the like. The zinc oxide thus produced had a bad texture and low strength or hiding power.

In an improved process described in French Patent No. 1,944,158, dated January 23, 1934, the zinc oxide obtained was of considerably better quality but the process involved the use of large quantities of water and was accordingly quite expensive.

It is the object of the present invention to provide a method which is inexpensive to carry out but which produces zinc oxide of the high grade required for pigment and similar purposes. Briefly stated, this process involves the calcination of the residues in an oxidizing atmosphere at temperatures above about 1000° F., followed by the quenching of the calcined material in cold water and the removal in solution of soluble salts during or after grinding. In the prior process involving calcination followed by removal of the soluble salts the conditions under which the calcination was carried out and the failure to quench the hot residues in water resulted in a product which was unsatisfactory whereas the modifications of this process forming the subject of the present invention produce a zinc oxide of a quite different and high grade quality.

As a starting point there may be used residues containing all or some of the products above enumerated. A typical residue containing zinc substantially solely in the form of oxide may contain moisture in the amount of 10% to 30%, while the dried residue may contain 90% to 98% ZnO, water soluble materials (principally alkali salts) up to 27%, materials insoluble in HCl up to 1%, Pb up to 0.2%, and small amounts of Cu up to .01%. In the case of a residue containing primarily zinc carbonate, moisture may run higher than 50% while the dried residue may contain ZnO and $ZnCO_3$ to a total of 80% or more, and alkali salts ($Na_2CO_3$ and $NaHCO_3$, principally), in quantities as high as about 20%. Such residues may contain heavy metals and materials insoluble in HCl in amounts similar to those mentioned above. It may be remarked that Pb in quantities of only about 0.2% and Cu in quantities less than .01% need not be removed as they do not affect the quality of the product.

In carrying out the invention the residues, which may be of the nature above indicated, together with various impurities principally of an organic nature, are introduced into a rotary furnace usually in the moist condition in which they are normaly obtained. They may be introduced in dry condition but there is no necessity for a separate drying step nor even for the delay involved in permitting them to dry in the air. Into this rotary furnace the oil for combustion and excess air are introduced to raise the temperature of the residues above about 1000° F. and preferably to between 1200° F. and 1400° F. It is found that above about 1400° F. the material tends to agglomerate. The agglomerates so formed are not broken down when the material is quenched at this higher temperature, and the result is a product which is difficult to mill, is low in hiding power, and has a rather low oil absorption. In the presence of the excess air accompanied by the rotation of the furnace any organic matter, as well as any metallic zinc, is oxidized while zinc carbonate is decomposed into the oxide and zinc sulphite is partially decomposed to oxide and partially oxidized to sulphate. If only unoxidizable materials are present, the calcination need not be carried out in an oxidizing atmosphere. Any alkalies present are finally found as carbonate or sulphate or in some other soluble form. The treatment is carried out until the transformations of the type just indicated are completed.

The residues are then quenched in cold water, preferably entering the water at temperatures not less than about 1000° F. to 1200° F., but preferably below 1400° F. The temperature of the water being substantially below that of the material quenched in it is quite unimportant and it may be raised to the boiling point by the material without affecting the quenching of subsequently added material. The violent explosive action resulting from the quenching appears to thoroughly overcome the undesirable results normally attained by calcination without quenching, serving to produce a final product satisfactory for pigment purposes, and giving a slurry which is comparatively easily washed and ground.

Following the quenching the suspension is passed through a ball mill in a closed circuit in which there is located a hydroseparator until the product is reduced to such a fine state of division that, upon drying a sample, over 99% will pass through a 325-mesh sieve. The overflow of the hydroseparator which contains the ground zinc oxide regulates the fineness of the product. The quenched zinc is in a closed circuit with the grinding system and the hydroseparator and fresh water is added to the system in an amount from about 3 to 6 gallons per pound of zinc oxide which is treated.

While less milling may be performed it has been found desirable for best results to secure as fine a state of division as just indicated. In this process solution of all the soluble salts of both zinc and alkalies will occur with the result that the insoluble material will be substantially pure zinc oxide containing only very small and negligible quantities of any impurities.

Following the milling the suspension is preferably permitted to thicken in vats while being slowly agitated by paddles. The resulting thickened pulp is then withdrawn from the supernatant liquid containing the impurities and filtered through a filter press. In general it is found that the thickening reduces the quantity of liquid contained in the pulp to such extent that the entrained salts after filtration are negligible in quantity. However, the filter cake may be washed if the original residues were found on analysis to contain a large proportion of materials which might be carried into the cake.

The filter cake is then dried on trays and finally milled and packed.

The product thus secured is of the high grade mentioned above and is suitable for use as a pigment or in various manufacturing processes such as those involved in the preparation of linoleum, pottery, rubber, etc.

What I claim and desire to protect by Letters Patent is:

1. The method of producing high grade zinc oxide suitable for use as a pigment from residues produced in a wet way and containing zinc compounds transformable to dry zinc oxide by calcination and also containing water-soluble alkali salts, comprising heating said residues to a temperature of substantially 1000° F. to 1400° F., quenching the residues in water while they are substantially at a temperature of the order of 1000° F., milling said residues in water in a closed circuit while separating from the circuit in suspension the finely ground product, and filtering to recover the product from the solution of soluble salts.

2. The method of producing high grade zinc oxide suitable for use as a pigment from residues produced in a wet way and containing zinc compounds transformable to dry zinc oxide by calcination and also containing water-soluble alkali salts, comprising heating said residues to a temperature of substantially 1000° F. to 1400° F., quenching the residues in water while they are substantially at a temperature of the order of 1000° F., milling said residues in a closed circuit while separating from the circuit in suspension the finely ground product, and filtering to recover the product from the solution of soluble salts.

3. The method of producing high grade zinc oxide suitable for use as a pigment from residues produced in a wet way and containing zinc compounds transformable to dry zinc oxide by calcination and also containing water-soluble alkali salts, comprising heating said residues to a temperature of substantially 1000° F. to 1400° F., quenching the residues in water while they are substantially at a temperature of the order of 1000° F., and milling said residues.

4. The method of producing high grade zinc oxide suitable for use as a pigment from residues produced in a wet way and containing zinc compounds transformable to dry zinc oxide by calcination and also containing water-soluble alkali salts, comprising heating said residues to a temperature of substantially 1000° F. to 1400° F., quenching the residues in water while they are substantially at a temperature of the order of 1000° F., milling said residues in water, separating in suspension the finely ground product, allowing the suspension to thicken by settling, and filtering the thickened suspension to recover the product from the solution of soluble salts.

MARTIN M. PEARLMAN.